(12) United States Patent
Chien (10) Patent No.: US 8,393,755 B2
(45) Date of Patent: *Mar. 12, 2013

(54) LED LIGHT DEVICE WITH CHANGEABLE FEATURES

(76) Inventor: Tseng-Lu Chien, Walnut, CA (US)

( * ) Notice: Subject to any disclaimer, the term of this patent is extended or adjusted under 35 U.S.C. 154(b) by 18 days.

This patent is subject to a terminal disclaimer.

(21) Appl. No.: 12/894,865

(22) Filed: Sep. 30, 2010

(65) Prior Publication Data

US 2011/0013398 A1 Jan. 20, 2011

Related U.S. Application Data

(62) Division of application No. 12/003,809, filed on Jan. 2, 2008, now abandoned.

(51) Int. Cl.
*F21V 11/00* (2006.01)
(52) U.S. Cl. .................................. 362/238; 362/249.09
(58) Field of Classification Search ............. 362/249.01, 362/249.02, 252, 648, 493, 238–240, 249.06–249.07, 362/249.1–249.11, 249.14–249.19
See application file for complete search history.

(56) References Cited

U.S. PATENT DOCUMENTS

| | | | | |
|---|---|---|---|---|
| 5,957,564 A * | 9/1999 | Bruce et al. | ..................... | 362/84 |
| 6,062,701 A * | 5/2000 | Hines | ............................ | 362/123 |
| 6,203,166 B1 * | 3/2001 | Byers | ............................ | 362/121 |
| 6,299,330 B1 * | 10/2001 | Michl et al. | ..................... | 362/239 |
| 6,401,404 B1 * | 6/2002 | Fillipp et al. | .................. | 52/80.1 |
| 6,419,373 B1 * | 7/2002 | Shieh | ....................... | 362/249.01 |
| 6,488,391 B1 * | 12/2002 | Gary et al. | .............. | 362/249.09 |
| 6,536,730 B1 * | 3/2003 | Baer | ............................ | 248/304 |
| 6,607,284 B1 * | 8/2003 | Tsai | ............................. | 362/121 |
| 6,693,391 B2 * | 2/2004 | Ahroni | ..................... | 315/185 R |
| 6,923,557 B2 * | 8/2005 | Jahn et al. | ..................... | 362/382 |
| 7,862,206 B2 * | 1/2011 | Chen et al. | .............. | 362/249.03 |
| 2002/0141184 A1 * | 10/2002 | Shieh | ............................ | 362/252 |
| 2002/0163806 A1 * | 11/2002 | Adams | ........................... | 362/252 |
| 2005/0248943 A1 * | 11/2005 | Tsai | ............................. | 362/249 |
| 2005/0265035 A1 * | 12/2005 | Brass et al. | ................... | 362/451 |
| 2008/0068838 A1 * | 3/2008 | Galke et al. | ................... | 362/250 |
| 2008/0151546 A1 * | 6/2008 | Tsai | ............................. | 362/252 |

\* cited by examiner

*Primary Examiner* — Julie Shallenberger
(74) *Attorney, Agent, or Firm* — Bacon & Thomas, PLLC (57) ABSTRACT

An LED light device with changeable function includes at least one LED install within a housing-unit, the housing-unit being arranged to enable change in the orientation, position, or viewing angle of any LED to allow the light device to emit light beams in a desired direction. The LED light device may have an extendable and foldable changing function to become a universal unit to fit all kinds of space, including indoors and outdoors.

17 Claims, 9 Drawing Sheets

FIG. 11 ns. 11/806,711; 10/883,747; 11/092,741; 11/094,215; 11/255,981; 11/498,881; 11/527,631; 11/498,874; 11/527,629; 11/527,628; and 11/806,284.

BACKGROUND OF THE INVENTION

The current invention relates to changing the orientation, position, or light emitting direction of the LEDs in an LED light device, and/or to changing the shape of the light device, enabling the light device to fit for all kinds of installation areas to provide a universal LED light device for the consumer.

The inventor's co-pending U.S. patent application Ser. No. 11/255,981, discloses a night light with more than one light source and co-pending U.S. patent application Ser. No. 11/806,284 discloses a night light with more than one optics medium. The disclosures of both applications are very important when applied to a light emitting diode (hereafter LED) because the techniques discloses in the applications can reduce the LED's spot light effect to provide a very good photometric arrangement and cause the LED light to look like a conventional non-LED light such as an incandescent bulb, Florescent tube, halogen bulb light patterns so can make the multiple LED light of the present invention become very useful to human beings.

The current invention uses a plurality of LEDs with more than one optics medium to provide a multiple LED light for a variety of applications, such as a night light, indoor lighting, cabinet light, under table light, decorative lighting, anywhere light, reading light, painting light, floor light, bathroom light, and outdoor lighting by transforming the narrow viewing angle LED light source into light source resembling a surface light such as a conventional incandescent bulb, florescent tube, halogen bulb or other available type from marketing place.

The current invention further incorporates adjust-means to cause the multiple LED light to have adjustable functions that make the multiple LED light really practical for installation anywhere in indoor, outdoor, and public areas.

The current invention not only provides a simple and functional LED light, but it will be appreciated by those skilled in the art that this excellent light performance skill incorporated with an adjust-means to build the multiple LEDs light. The multiple LEDs light with more than one LED and more than one optics means with adjustment means enables the multiple LEDs light to become very useful to people and supply great and convenient illumination to all human beings.

DETAILED DESCRIPTION OF THE PREFERRED EMBODIMENTS

Figure 1:
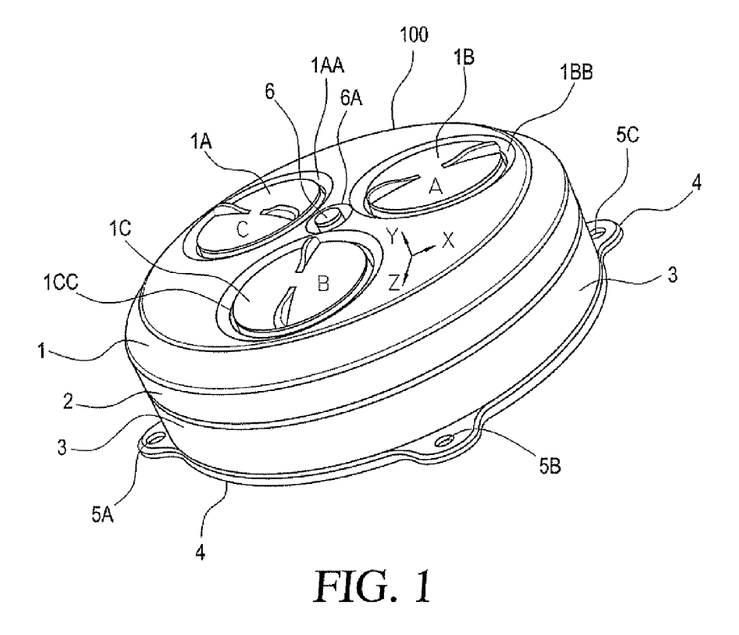
FIG. 1 shows a first preferred embodiment of an LED light device with LED orientation, position, or light emitting direction, or device shape changing features.

FIG. 1 shows a multiple LEDs light device with adjustable angle features (100), which has a top cover (1), tray (2), battery compartment (3), and attachment base (4). The cover (1) has a plurality of holes (1A) (1B) (1C) to allow the plurality of LED-units to fit within. Each of the LED-units has its lens (1B), housing (not shown here), LED (not shown), and swivel means (not shown). Each of the LED-units can swivel on a vertical-axis (Y-axis) for s certain number of degrees up and down and can rotate on a horizontal-axis (X-axis) for a certain number of degrees right and left based on its desired construction to enable the LED's light beam to be emitted to a desired position even though the multiple LEDs light device has been fixed in position.

As shown in FIG. 1, the multiple LEDs light device (100) has 3 LED-units (A) (B) (C) within the holes of the cover (1). Each LED-unit can swivel on the y-axis for certain degree angle and also can rotating on the x-axis for a certain degree angle. The plurality of LED-Units can each have its own light beam be emitted in a desired direction and provide a desired location or areas with nice illumination. The tray (2), battery compartment (3), and attachment base (4) are assembled together to allow the multiple LEDs light device to be fixed on a desired surface.

Figure 2:
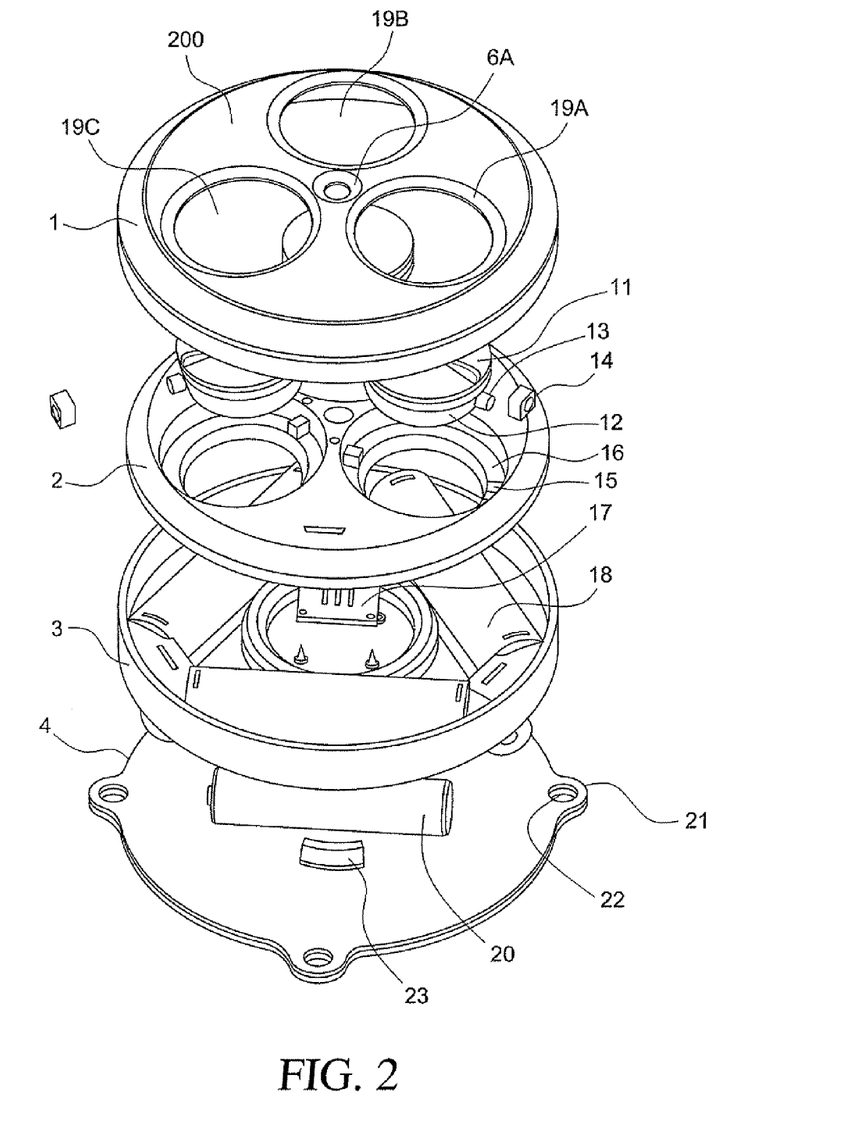
FIG. 2 shows construction details of the first preferred embodiment.
Figure 3:
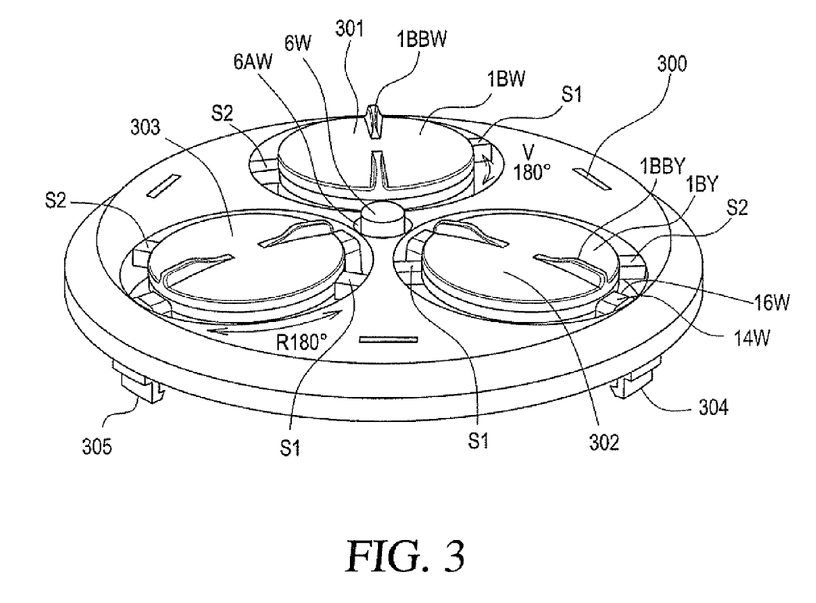
FIG. 3 shows the first preferred embodiment with an adjustable angle construction.
Figure 4:
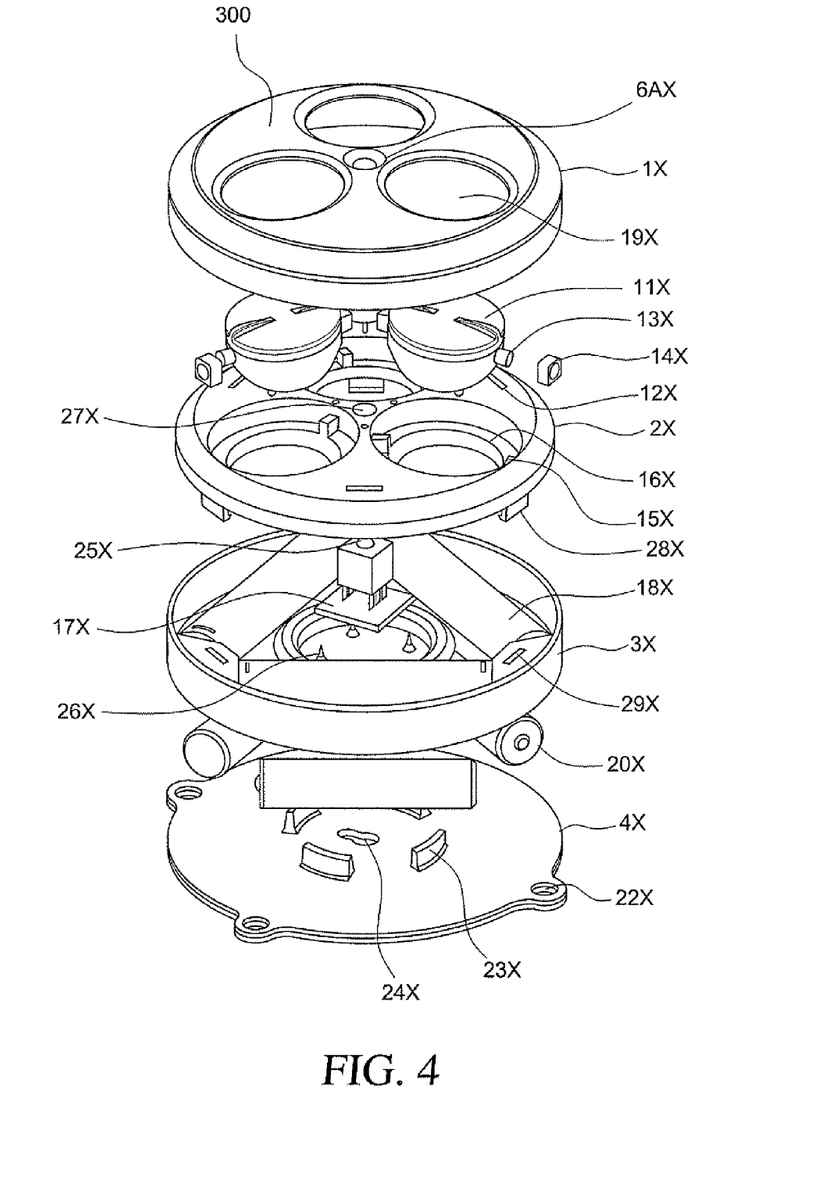
FIG. 4 shows further construction details of the first preferred embodiment.

As shown in FIG. (2), the multiple LEDs light device (200) has a top cover (1) with preferably 3 holes (19A) (19B) (19C) to allow the three LED-Units to fit into the three holes. Each LED-unit has its lens (11), reflective housing (12), extended poles (13), and help-means (14) to enable each LED-unit to be installed on the track (16) and to rotate with respect to the track (16) horizontally along the cover surface (the x-axis) for a certain number of degrees right or left until it hits the stopper (15). The two extended-poles (13) allow the LED-unit to swivel vertically along the cover surface (the y-axis) for a certain number of degrees up or down until the housing (12) hits the stopper of the tray or cover. These LED-units can both swivel and rotate the housing along the vertical and horizon directions of the cover surface so each of the LED-units can emit the inner LED's light beam in any direction as desired. As shown in FIG. 2, the tray (2) has a track construction (16) to allow the extended-poles (13) to fit and obtain a swivel function. The number of the track construction will depend on the market requirement and is not limited to three as in current preferred embodiment. It can be any number and size to match the LED-unit size. The LED-unit size can be very small—around 3 mm or 5 mm or 10 mm, or larger or smaller—depending on market requirements. It will also be appreciated that the plurality of LED-units and their track-construction can be arranged in any arrangement such as in an array-arrangement with for example 100 pieces in a vertical direction and 100 pieces in a horizontal direction, which can be spaced any distance. It will also be appreciated that within the scope of the current invention, the number and the arrangement of the LED-units can be varied to fit any desired geometric surface in a variety of dimensions and with any desired LED-units. For example, the LED-units can be arranged as the FIG. 3-B, to form a rod shaped (31A) (31B)

surface such that each of the LED-units (400) with its extended-poles (13U) (13V) fits into a groove (32) so that a certain quantity of similar LED-Units (400) on this rod-shape surface make a good multiple LEDs light device with adjustable angle features in a elongated shape or linear shape for cabinet light fixtures for anywhere installation. Hence, the number of the LED-units, the arrangement of the LED-units, the geometric shape of the surface of the light device is variable depending on market requirements. It will be appreciated that all these variable details will still fall within the current invention scope of the claims, as will alternative or equivalent methods.

As shown in FIG. 2, the help-means (14) may have a round nut-shape which can be fitted on the end of the extended-poles (13) to provide a fine tire-like surface that enables the extended-poles (13) to move very smoothly on track (16). This is an optional means for the current invention. The help-means also can be a nut-shape with gear-teeth on the outside so as to enable rotation with a clinking sound and precise movement because of the teeth construction on the nut-edge. There are a variety of constructions that make the extended-poles move on the track depending on market requirements and that still fall within the current invention scope.

Also as shown in FIG. 2, the cover (1) and tray (2) are assembled together by conventional assembly means so that the LED-units can be well installed and the angles of the LED-units can be freely adjusted as desired. Each LED (not shown) has an electric-means to connect the LED with the circuit board (17) and provide pre-determined functions using a market available circuit. The functions may include turning the LED on or off, sequential on/off, flashing, random on/off, pair-flash, fade-in and fade-out, chasing, or any light performance which can be driven by electric signals from the circuit or integrated circuit (I.C.), all of which fall within the scope of the invention. The circuit board may further be incorporated with switch-means which may selected from the group including a manual switch, photo sensor, other sensor means, moisture sensor, fire sensor, heat sensor, metal sensor, electric sensor or mechanical sensor, timer, and PIR sensor, to enable the multiple LEDs device with adjustable angle function to be turned on and off according to a predetermined function and duration.

The circuit (17) is connected to a desired power source (18), which may be in different voltage and current form. The circuit (17) can connect with a 110 Volt 60 Hz home electricity system or a direct current system as long as the circuit (17) can provide the LED with a required current. This means that the circuit can be designed to utilize a DC power source or can be designed to work with an AC power source. All these circuits are available from the marketplace and therefore are not discussed in detail herein. As shown in FIG. (2), The preferred embodiment may include a DC (Direct Current) power source which may be in the form of a battery set. The battery set can have a desired working voltage and capacity depending on the LED's specification. For example, some LEDs can be turned on by a lower voltage such as 1.68 Volt DC, while some LEDs need a higher voltage such as 4.5 Volt, so voltage will depend on the LED's specification. The LED's color and its construction will also determine the final design for the battery-set's number and capacity, so any alternative specification will still fall within the current invention scope. As for the first embodiment, the battery-set includes three 1.5 Volt batteries in series to drive white color LEDs, but alternative battery-sets and different electric connections for any number of batteries will still fall within the current invention scope.

As shown in FIG. 2, the battery compartment (3) has a plurality of batteries (18) and a circuit (17) fitted within. The circuit (17) has a conductive-means to provide an electric connection to deliver electric signals from the power source (18) (here illustrated as the battery-set) to the plurality of LEDs. An optional electric-component, electric-device, mechanical-device, switch-means, timer-device, sensor-device, or IC may be added to provide required functions and light effects. The battery-compartment (3) has attachment means (22) or (23), phone-hook device (not shown here), double-side tape, foam-tape, glue, or other equivalent attachment-means on the attachment-base (4) to cover the battery-compartment (3) and allow people to install the multiple LEDs light device on a desired surface.

As shown in FIG. 3-C, the tray (302) of one of a preferred embodiment has three holes to fit three LED-units (301) (302) (303). Each LED-unit (301) (302) (303) has a track (16W) and extended-poles (14W) are fit on the respected track (16W) with a stopper (S1) (S2) to make the LED-units (301) (302) (303) have a vertical swivel of up to 180 degrees (V180) and horizontal rotation of up to 180 degrees (R180). The center of the tray (300) has one opening or window (6AW) to allow the switch-means (6W) to be activated though the opening (6AW) or the window. If 6AW is an opening, the switch-means should be up the surface. If 6AW is a window, the switch-means should be lower than the surface. The marketplace has a lot of different switch-means that can be selected for certain applications.

FIG. (4) shows more details of the construction for multiple LEDs units of FIGS. (1), (2) (3). All of the elements of the unit illustrated in FIG. (4) are also illustrated in FIGS. (1), (2) (3) and discussed above, and therefore there is no need to discuss more details of the construction. It will be appreciated that all the alternative, replaceable, and/or equivalent functions of any parts discussed above should be still fall within the current invention's scope.

Figure 5:
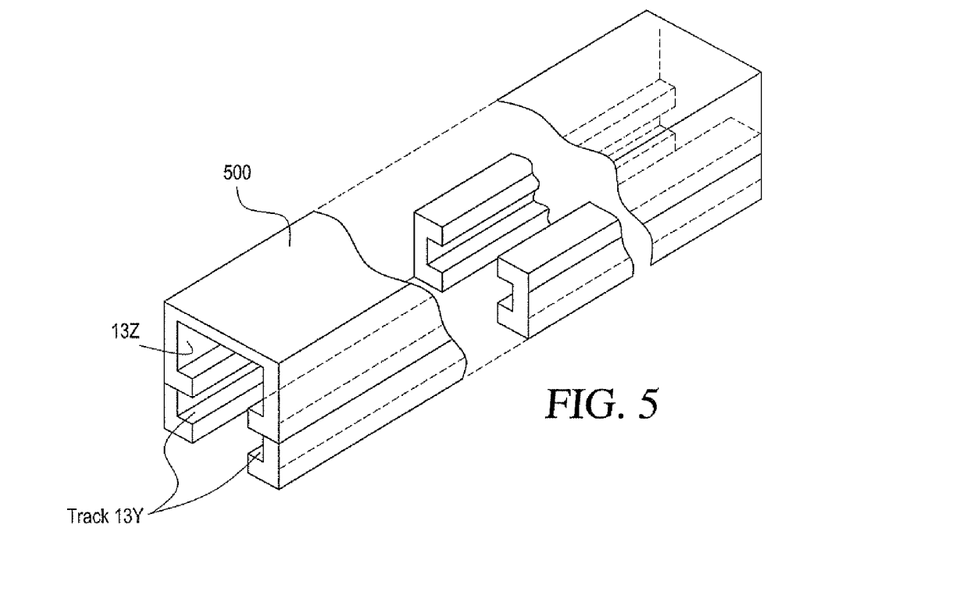
FIG. 5 shows a second preferred embodiment with track-means for multiple LEDs light device.

As shown in FIG. (5), the track means design (500) can be an elongate shape with lower track (13Y) or upper track means (13Z).

Figure 6:
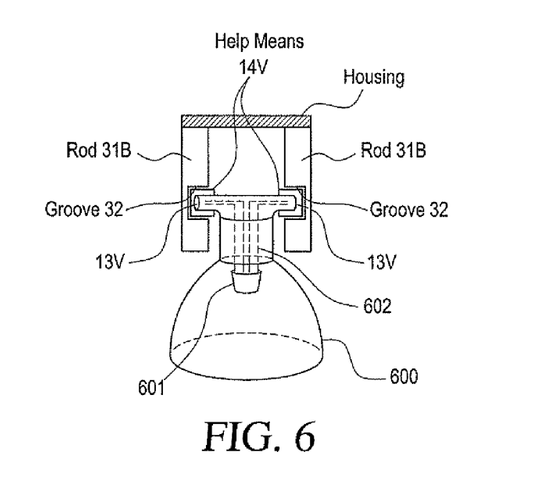
FIG. 6 shows the second preferred embodiment with alternative track-means.

FIG. (6) shows a front view of the rod (31A) and rod (31B), both of which have a groove (32) to allow the LED-unit (600) fitted within the groove (32) to move freely to adjust the angle. The help-means (14), as above discussed, may optionally be included to facilitate adjustment of the LED-unit. The help-means can incorporate the extended-poles to enable the LED-units to move freely to adjust their angle, fix their position, tighten the LED-units on the track-means, and/or provide electric signal delivery. The design and construction of the help-means can be any type from the conventional marketplace as long as they can incorporate the LED-unit's extended-poles to facilitate fastening, deliver a current signal, adjust an angle, and provide space to fix the LED-units.

Figure 7:
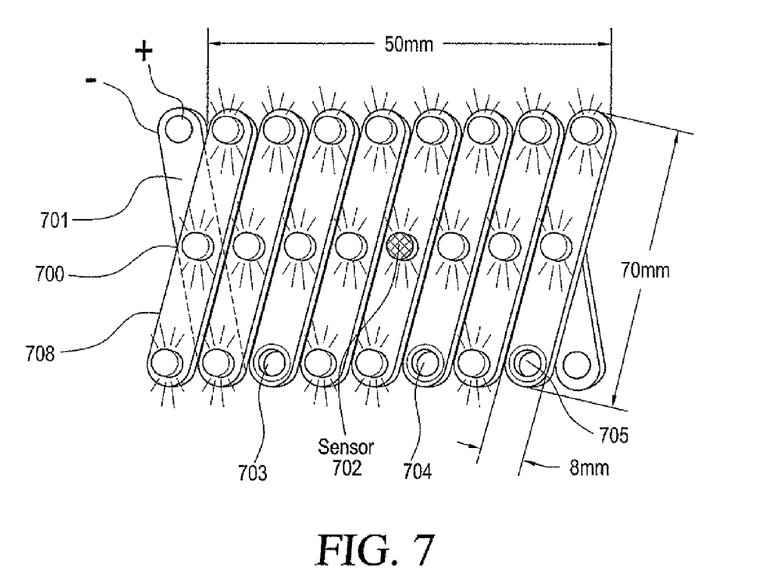
FIGS. 7 and 8 shows a third preferred embodiment of an LED light device with LED orientation, position, or light emitting direction, or device shape changing features

FIG. 7 shows a third preferred embodiment which is extendable from a short length of 50 mm to a preferred length of 320 mm. This length is extendable almost 6.4 times. This LED light device can preferably change in the following ways: (a) the LED relative position with respect to other LEDs can be changed; (b) the device shape can be changed; (c) the light emitting direction, position, and areas can be changed; and (d) the number of LEDs also can be changed. This preferred embodiment of the current invention has extendable features which may be incorporated with conventional flexible means selected from a rivet, hinge, chain, screw, metal parts, plastic parts, rings, rotating means, snap means, hook means, cover means, press-tight means and, without limitation to the above, other means from the conventional market and traditional skill of the art. The preferred embodiment also can use equivalent methods to get the same extendibility function to enable the light device to change size, dimension, and geometric configuration. It will also be appreciated that each housing-unit may have different dimensions including length, width, thickness, shape, geometric design, finish, marking so as not to be limited to one size. The housing unit can be very small for infant toy use or big up to "China Great Wall" size. The current invention can have any desired size as long as is has a proper dimension for each housing-unit, in order to easily get desired features to use for all different spaces where human beings stay, including indoors and outdoors.

The preferred embodiment has by way of example one folded and extended relative dimension for use from a 50 mm to 320 mm range, but can be smaller or larger (up to kilometer or miles range).

Figure 8:
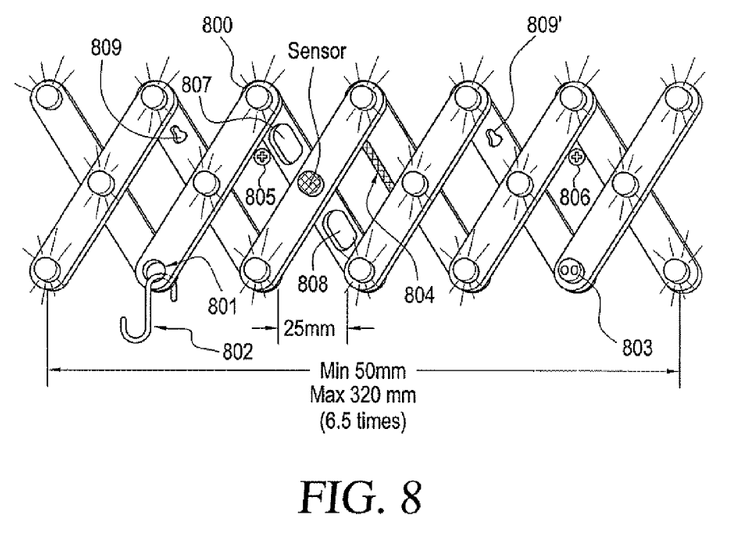

FIG. 7 and FIG. 8 show further features to enable the conventional LED light device to become a universal light device and allow the consumer to install the device in more locations with less limitation. As shown therein, the LED light device as discussed above may be incorporated with sensor means of mechanical or electric type such as a photo sensor, motion sensor, timer, manual switch, humidity sensor, smoke sensor, heating sensor, magnetic sensor, or tilt sensor.

As shown in FIG. 7 the LED light device (700) has a top grille housing-unit (708) and lower grille housing-unit (701). The power source may be an alternative power source or battery power source depending on marketing requirements. The top housing-units (708) may have a desired number of LEDs installed within the housing-unit (708). Each top housing-unit (708) and lower housing-unit (701) is connected to conventional electric conductive means, which may include a conductive resilient means, conductive metal spring, conductive metal ring, conductive wire, and/or conductive metal piece to provide electricity delivery from the power source end (+) (−) of the first housing-unit to the last housing-unit and connect all the LEDs as desired in-series or in-parallel to meet marketing requirements.

It is to be appreciated that the current LED light device may be incorporated with sensor means (702) such as a preferred motion sensor and photo sensor when the power source is a battery, in order to save power. The sensor also can be another type of sensor or switch as above discussed. For more practicality, some locations (703), (704), (705) may designed as a hole with rotatable features to install hooks, a post, a bar, or an electric device to provide the LED light device with more functions than just a light device. These additional holes can allow people to hang clothing or a jacket, hat, cap, or bag, or even use the circuit to charge batteries in another device such as a communication device, cell phone device or other computer device which use a battery. It is simple to just add one additional circuit to drive the power source and provide a desired electric signal having a certain voltage and current to charge batteries used for communication, computer, and consumer products.

FIG. 8 shows the same embodiment as FIG. 7, but the LED light device has been extended to longer length, for example from a FIG. 7 length of 50 mm to a FIG. 8 length of 320 mm. Each connection point for joining the lower house-unit with the top house-unit may be by conventional available flexible means as discussed above.

The LED light device (800) includes attachment means selected from glue, double-side tape, foam tape (804), hook and loop tape, chemical adhesive material, screws (805) (806), a phone hook and catch (809) (809'), holes (807) (808), a rivet or a hold tray with its attachment means.

As shown in FIG. 8, some of the flexible connections (801) where preferable are not installed on the LED-unit. Instead, the rivet or equivalent flexible connection means are incorporated with a pole, hook (802) or other metal or plastic device to allow the LED light device to offer another function such as hanging a cloth, cap, hat, or bag. The added function can involve an electric device or non-electric device to add the function on this extendable LED light device.

As shown in FIG. 8, the sensor means as discussed above may include any mechanical or electric type sensor such as a photo sensor, motion sensor, timer, manual switch, humidity sensor, smoke sensor, heating sensor, magnetic sensor, tilt sensor.

Figure 9:
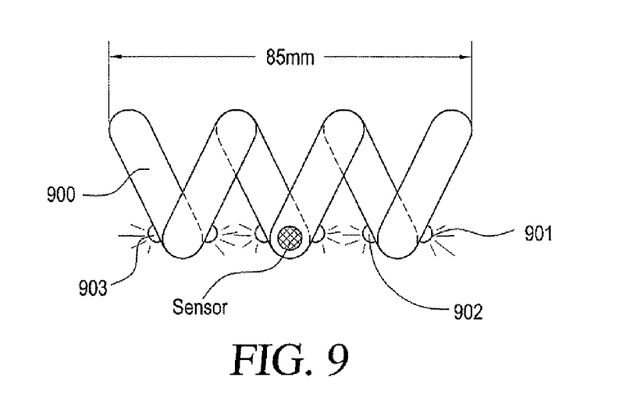
FIGS. 9 and 10 show a fourth preferred embodiment of an LED light device.
Figure 10:
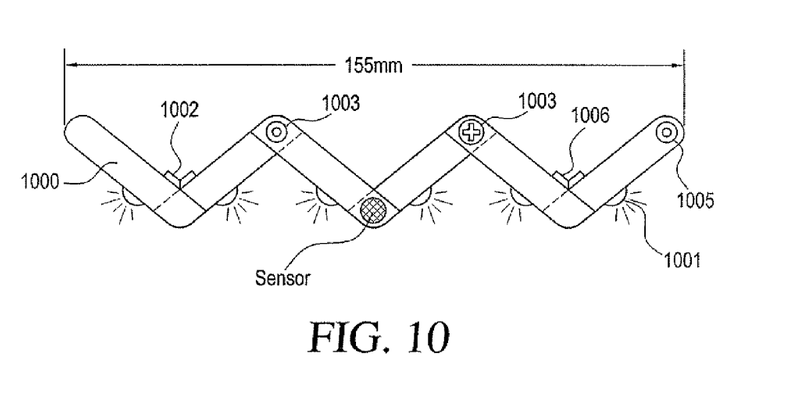
Figure 11:
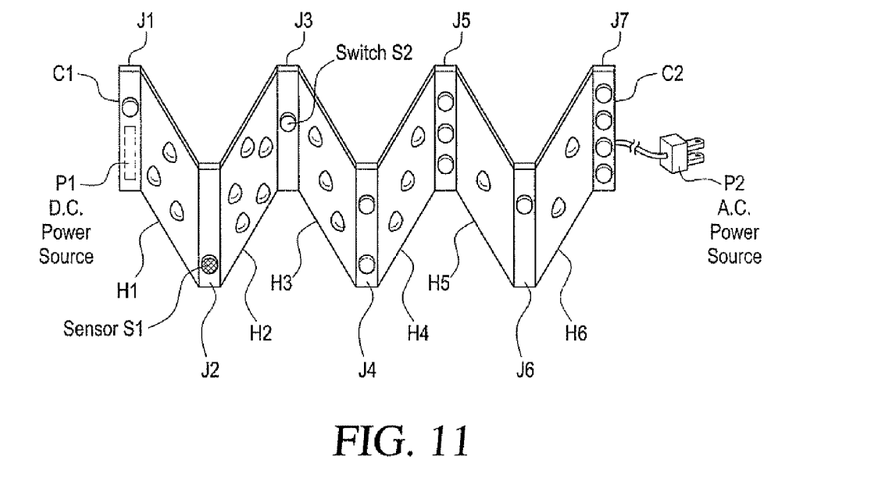
FIG. 11 shows a fifth preferred embodiment of an LED light device.

FIG. 9 and FIG. 10 show an LED light device with flexible means according to a fourth preferred embodiment, which has foldable or flexible changing features. FIG. 10 shows an extended length of 155 mm, which is extended from the FIG. 9 folded length of only 85 mm. The preferred flexible means may include hinges (1002) (1006), a rivet (1003), a special screw (1004), or nuts (1005) as discussed above, or any equivalent-function metal or plastic means to provide flexible or folded properties of the housing-unit (1000). The LED-unit (1001) may be the LED-units of the first or second preferred embodiment, which allows the LED-unit to have an adjustable angle and enable the LED light beam to be emitted to a desired location. The earlier discussion can allow the LED light beam to be adjustable with respect to x-y-z axes as desired.

As shown in FIG. 10, the inclusion of sensor means in the preferred embodiment has the advantage that, when the power source (not shown) is a battery, good power saving can be achieved if the sensor is a motion sensor, photo sensor, or any combination of a conventional market available switch and sensor means.

The above discussed and mentioned preferred embodiments are intended to show the scope of the current invention, but it will be appreciated that any alternative or equivalent functions of design are still within the scope of the invention, which is not limited to the above discussed and mentioned details. Any alternative or equivalent arrangement, process, installation or like design, even though involving changes from the current invention, may still fall within the scope of the current invention.

I claim:

1. An LED light device, comprising: a plurality of housing units including at least one LED light unit installed therein, each said LED light unit having at least one LED, and said housing units being connected by a plurality of joint means for allowing the light device to be moved from one display position to at least one different display position by movably connecting adjacent housing units directly to each other to thereby change an orientation, position, or angle of the light units in one of the housing units relative to the light units in at least one other of the housing units while conducting electricity between the adjacent housing units, wherein: the housing units are separately movable relative to the joint means or other housing units by an external force, the housing units each having any geometric shape, dimension, color, material, and other characteristics, the housing units being arranged in an array, dot matrix design, or other geometric configuration, and and LED light units each being further arranged to emit light beams in different directions to any desired location in each of said different display positions by adjusting an angle or orientation of said at least one LED within said LED light unit and relative to said housing-unit; circuitry for driving the at least one LED in each of said housing units to emit light under any predetermined light function, duration, timing, and colors by supplying electricity to said housing units through said joint means; and attachment means for installing the light device on a surface.

2. An LED light device as recited in claim 1, wherein said housing units are movable in three dimensions, said movement including rotation about a desired axis, translation with respect to a same or different desired axis, or rotation and translation about a same or different axis.

3. An LED light device as recited in claim 1, wherein said circuitry includes circuitry for connecting to an AC or DC power source.

4. An LED light device as recited in claim 1, wherein the light device is arranged to have an adjustable size or configuration so that it will fit into available spaces in a variety of different areas, including indoors, outdoors, and in vehicles.

5. An LED light device as recited in claim 1, wherein at least one of the housing units includes a lens and a reflector.

6. An LED light device as recited in claim 1, wherein the attachment means is selected from the group consisting of glue, double-sided tape, foam tape, hook and loop fasteners, chemical adhesives, screws, phone hook and catches, rivets, and hold trays.

7. An LED light device as recited in claim 1, wherein at least one of the housing units includes optical means for changing a beam emitted by the LED from a spot light to a beam having a wider viewing angle.

8. An LED light device as recited in claim 1, wherein the circuitry includes means for converting an input current into an LED trigger current having a pre-determined function, timing, and duration.

9. An LED light device as recited in claim 1, wherein the circuitry includes at least one of an integrated circuit, switch, and sensor.

10. An LED light device as recited in claim 9, wherein the sensor is one of a photo sensor, motion sensor, timer, manual switch, humidity sensor, smoke sensor, heat sensor, magnetic sensor, and tilt sensor.

11. An LED light device as recited in claim 1, wherein said joint means includes flexible means that enables movement of at least one of the housing units relative to other housing units.

12. An LED light device as recited in claim 11, wherein the flexible means is selected from the group consisting of a rivet, hinge, chain, screw, metal part, plastic part, ring, rotating member, snap member, hook, cover member, and press-fit member.

13. An LED light device with multiple relatively movable LEDs, comprising: a plurality of housing units wherein each housing unit is directly connected to an adjacent housing unit by joints, said housing units being relatively movable; and mounting means for enabling for adjustably mounting the LEDs to emit light beams in different desired directions in different display positions by adjustably mounting the LEDs on different housing units, on the joints, or on both the different housing units and the joints so that, when said housing units are moved relative to each other by an external force, said LEDs are moved from one said display position to at least one different said display position in which said relative position, orientation, or angle of said LEDs is changed, and wherein an angle or orientation of said LEDs is further adjustable in said different display positions to change said light emission directions of said LEDs, circuit means for driving the LEDs to emit light under any predetermined light function, duration, timing, and colors; wherein conductive elements extend through the joints to supply power to the LEDs; and attachment means for installing the housing units on a surface.

14. An LED light device as claimed in claim 13, wherein the housing units form an extendable housing whose length is changed by relative movement of the housing units.

15. An LED light device as claimed in claim 13, wherein the housing units are connected to each other by rivets that form pivots for said housing units.

16. An LED light device as claimed in claim 13, wherein additional devices are installed on said housing units.

17. An LED light device, comprising: a plurality of housing units including at least one LED light unit with at least one LED installed therein; flexible means directly connecting adjacent housing-units for changing an angle of a respective said housing-unit relative to an angle of another said housing-unit to thereby change a relative position between LED light units on different said housing units and cause a direction of a light beam emitted by the LED in one of said housing units to change relative to a direction of a light beam emitted by the LED in another of said housing units when the housing units are moved from one display position in which the LEDs in said housing units emit light to another display position in which the LEDs in said housing units also emit light, and wherein an angle or orientation of said LEDs is further adjustable in said different display positions to change said light emission directions of said LEDs; a power source; and circuitry for driving the at least one LED in each of said housing units to emit light under any predetermined light function, duration, timing, and colors, said circuitry being connected to the power source by means of conductive elements extending through said flexible means and said housing units.

* * * * *